United States Patent [19]

Amann

[11] Patent Number: 5,406,461
[45] Date of Patent: Apr. 11, 1995

[54] ILLUMINATION SYSTEM FOR OPTICAL EQUIPMENT WITH SEPARATE ILLUMINATING BEAM PATHS

[75] Inventor: Bernd Amann, Hohenems, Austria

[73] Assignee: Leica Heerbrugg AG (Schweiz), Heerbrugg, Switzerland

[21] Appl. No.: 838,399

[22] Filed: Feb. 18, 1992

[30] Foreign Application Priority Data

Feb. 15, 1991 [DE] Germany .................. 41 04 609.9

[51] Int. Cl.$^6$ ............................................. F21V 19/04
[52] U.S. Cl. ..................................... 362/20; 362/254; 362/286; 362/804; 359/390
[58] Field of Search ............... 362/20, 232, 233, 254, 362/286, 282, 319, 339, 372, 272, 804; 315/131, 86; 307/66; 359/385, 388, 390

[56] References Cited

U.S. PATENT DOCUMENTS

| 3,136,920 | 6/1964 | Jensen | 315/131 |
|---|---|---|---|
| 3,678,286 | 7/1972 | Willis | 362/254 |
| 3,798,435 | 3/1974 | Schindl | 362/232 |
| 3,832,539 | 8/1974 | Oram | 362/804 |
| 4,399,358 | 8/1983 | Burkhardt et al. | 362/20 |
| 4,402,038 | 8/1983 | Hartung et al. | 362/276 |
| 4,479,700 | 10/1984 | Abe | 359/385 |
| 4,673,824 | 6/1987 | Pepper | 307/66 |
| 4,687,913 | 8/1987 | Chaban | 359/385 |
| 4,751,398 | 6/1988 | Ertz, III | 315/86 |
| 4,855,875 | 8/1989 | Onose et al. | 362/254 |
| 5,023,515 | 6/1991 | Olon et al. | 362/20 |
| 5,032,962 | 7/1991 | Gehly et al. | 362/20 |

FOREIGN PATENT DOCUMENTS

| 0512192 | 1/1921 | France | 362/804 |
|---|---|---|---|
| 0825638 | 12/1959 | France | 362/804 |
| 2024114 | 5/1976 | Germany . | |
| 1489516 | 9/1976 | Germany . | |
| 3427592 | 9/1987 | Germany . | |
| 0285912 | 11/1989 | Japan | 359/385 |

Primary Examiner—Ira S. Lazarus
Assistant Examiner—Y. Quach
Attorney, Agent, or Firm—Foley & Lardner

[57] ABSTRACT

An illumination system for optical equipment, such as an operating microscope, includes at least two separate illuminating beam paths, a first light source, and a lamp housing. At least one additional light source is provided on a rotatable lamp quick-change attachment. When the first light source fails, the first light source is automatically replaced with the additional light source.

12 Claims, 5 Drawing Sheets

ILLUMINATION SYSTEM FOR OPTICAL EQUIPMENT WITH SEPARATE ILLUMINATING BEAM PATHS

BACKGROUND

The invention is directed to an illumination system for optical equipment. More specifically, the invention is directed to an illumination system with at least two illuminating beam paths. These illumination systems are used, for example, in microscopes used in operating rooms.

Such microscopes typically have a plurality of separate observation beam paths to permit several people to work simultaneously on one object, or subject. These microscopes are often equipped to allow each individual to select their own magnification and their own focal plane. For these purposes, each observation beam path must generate, on the object, a light intensity that is as high and uniform as possible.

In medical applications it is also necessary to ensure that the subject is not damaged by the illuminating light. Furthermore, during an operation the reliability and operational safety of the microscope are of particular concern. For example, if the procedure for replacing a halogen lamp that has unexpectedly failed is complicated, then interruption of the operation might be required. This could have grave consequences.

A disadvantage of conventional microscopes used for medical applications is that the halogen lamps used for such microscopes have a relatively short service life. A typical service life is 50 operating hours. Service life is significantly less than 50 operating hours when, for example, heat dissipation is unsatisfactory or when the halogen lamp is operated in an over-voltage condition.

SUMMARY OF THE INVENTION

It is an object of the instant invention, therefore, to provide a microscope for use in medical applications which has improved operational safety.

It is another object of the invention to provide a microscope for use in medical applications which produces optimum lighting conditions on the subject.

According to a first aspect of the invention there is provided an illumination system for optical equipment. The illumination system includes a lamp housing and at least two separate illuminating beam paths to illuminate an object via a main objective. The at least two illuminating beam paths originate from the lamp housing. A first light source is mounted in the lamp housing in a lamp quick-change attachment. The lamp quick-change attachment also holds at least one additional light source.

According to another aspect of the invention there is provided an illumination system which includes a rotatable lamp quick-change attachment, a first light source mounted to the lamp quick-change attachment, and an additional light source mounted to the lamp quick-change attachment. An electromechanical assembly automatically replaces the first light source with the additional light source when failure of the first light source occurs. The illumination system can also include at least two separate illuminating beam paths and/or an annunciator to indicate that the additional light source is defective. An accumulator can be provided to power the annunciator after the main power supply has been switched off.

Other objects, features, and advantages of the invention will be apparent from the following description of preferred embodiments.

BRIEF DESCRIPTION OF THE DRAWINGS

The invention will be described in further detail with reference to the accompanying drawings, wherein.

DETAILED DESCRIPTION OF THE PREFERRED EMBODIMENTS

An important feature of the invention is that a halogen lamp is arranged centrally in a lamp housing and that illuminating beam paths are formed symmetrically with respect to the plane of the lamp housing. The illuminating beam paths are guided out from the lamp housing separately on opposite sides to a common main objective. This design results in generated light being distributed uniformly into respective illuminating beam paths or associated observation beam paths, thus creating uniform illumination conditions. Furthermore, only a single halogen lamp is in a working position and heat generated by the lamp is dissipated in a simple manner.

In one embodiment, a cold light mirror is provided in each of the illuminating beam paths. This feature eliminates thermal loading on the object by incident light beams.

Figure 1:
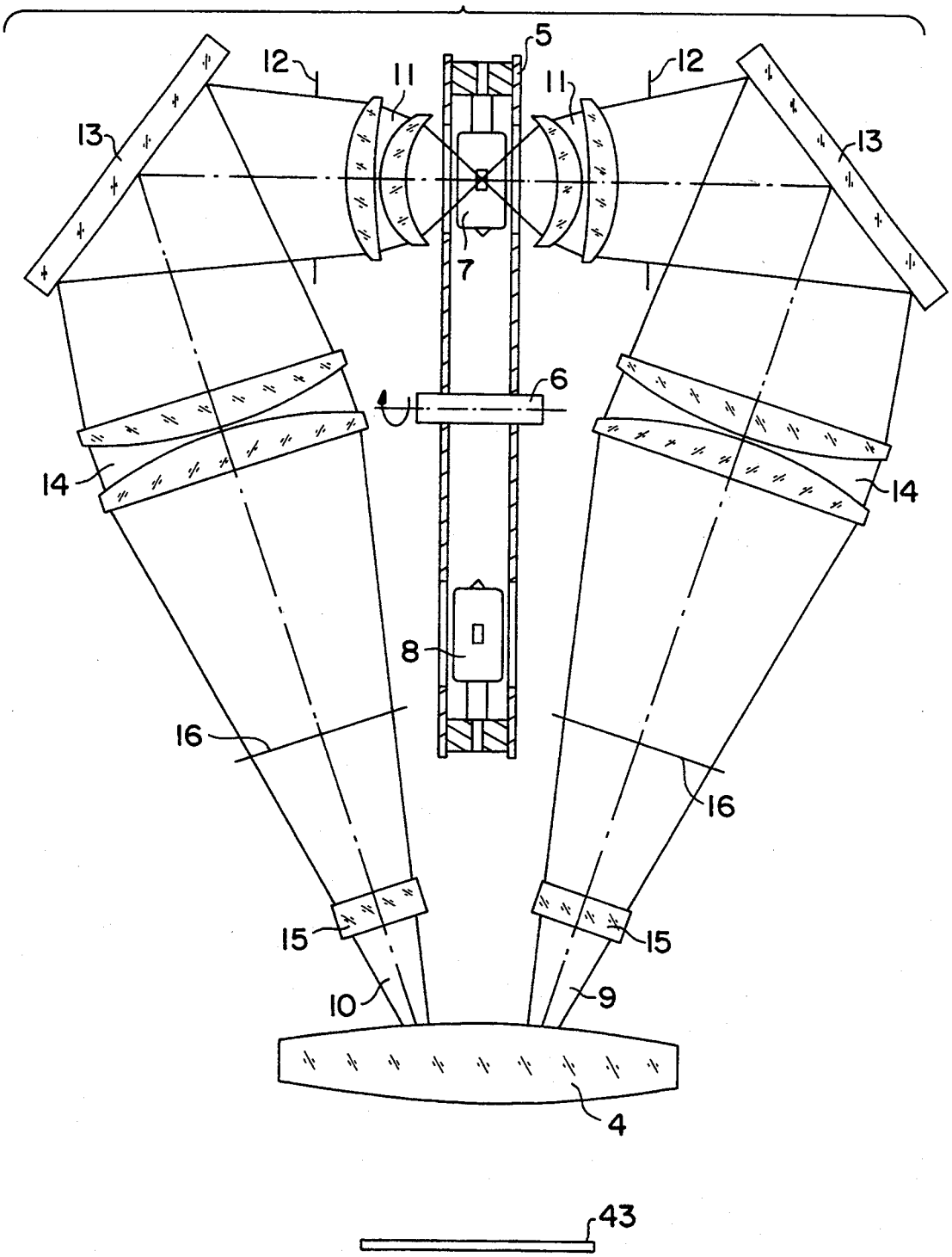
FIG. 1 illustrates a preferred embodiment of the invention.

FIG. 1 illustrates a preferred embodiment of the invention. FIG. 1 illustrates a lamp quick-change attachment 5 and two separate illuminating beam paths 9 and 10. The quick-change attachment 5 is in the form of a wheel which rotates about an axis 6. A light source 7 and an additional light source 8 are mounted on quick-change attachment 5. Light source 7 and 8 are halogen lamps.

Starting from the light source 7, there is arranged in each of the illuminating beam paths 9 and 10 an adjustable collector lens system 11, an adjustable stop 12, an adjustable cold light deflecting mirror 13, adjustable illuminating optics 14, a filter holder 16, and an adjustable deflecting prism 15. The illuminating beam paths 9 and 10 are separate from one another. More precisely, the illuminating beam paths 9 and 10 are symmetric with respect to the plane of the lamp quick-change attachment 5. Illuminating beam paths 9 and 10 share a common main objective 4.

Figure 2:
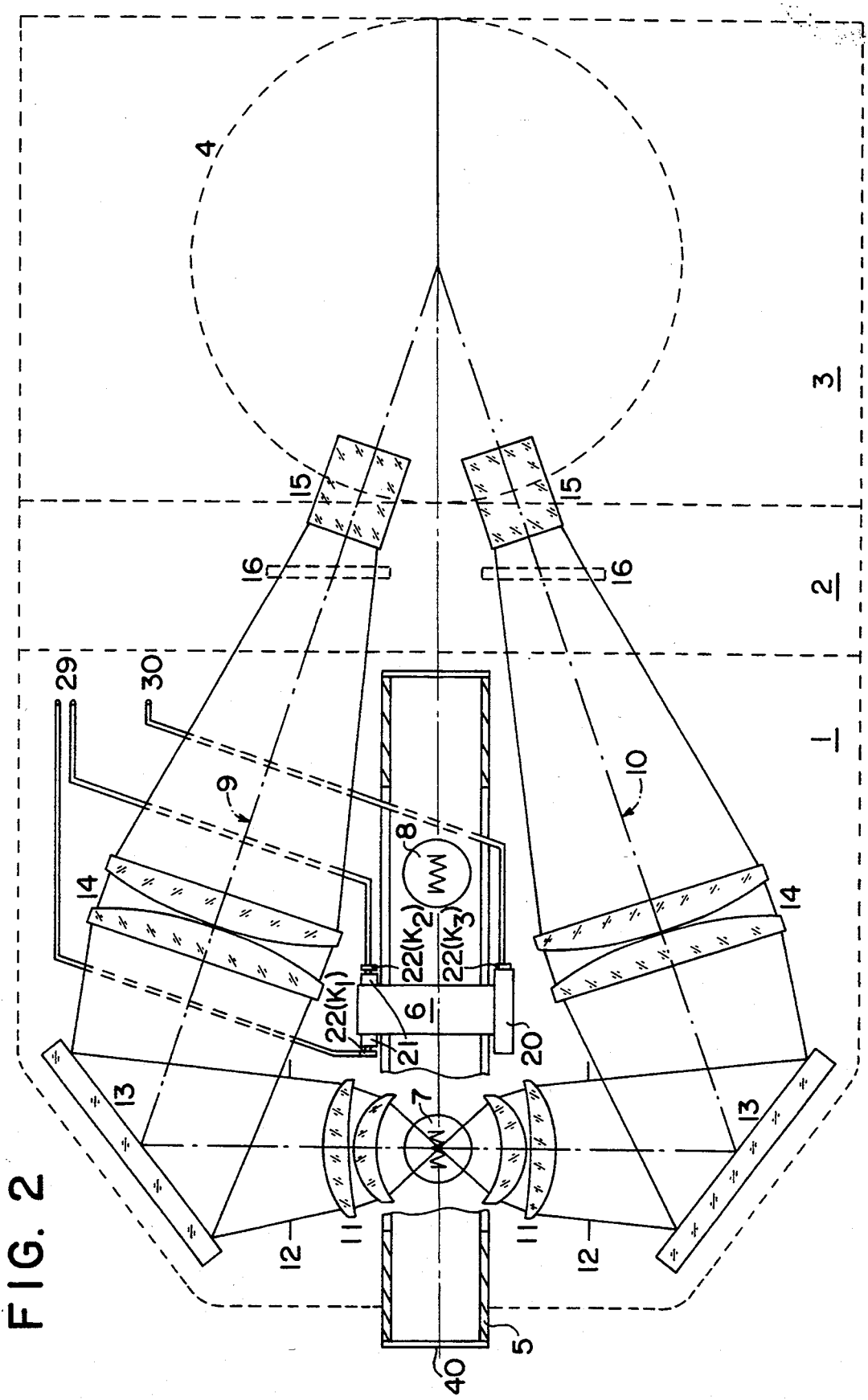
FIG. 2 illustrates a horizontal section of the FIG. 1 preferred embodiment.

FIG. 2 illustrates a top view of the FIG. 1 preferred embodiment. FIG. 2 illustrates a lamp housing 1 and the separate illuminating beam paths 9 and 10. For clarity, beam paths 9 and 10 are illustrated in FIG. 2 as being in the same plane as quick-change attachment 5. In actuality, beam paths 9 and 10 leave this plane after passing through collector lens systems 11, as illustrated in FIG. 1. Lamp housing 1 is connected to an operating microscope 3 via a support 2.

Light source 7 is located at a working position at a central point of lamp housing 1. Light source 7 is mounted on lamp quick-change attachment 5. Lamp quick-change attachment 5 projects from the lamp housing 1 at one point to provide a handle 40. Quick-change attachment 5 is mounted rotatably about axis 6 and has at least one additional light source 8. In this embodiment, additional light source 8 serves as a reserve light source.

In the event of failure of light source 7, lamp quick-change attachment 5 is rotated via handle 40 and reserve light source 8 is brought into working position between the collector lens systems 11. Additional light source 8 can have physical and optical properties that are different from light source 7. Thus, the instant invention can be employed, for example, in applications where the color temperature of the illuminating light must be changed during microscope usage.

Light source 7 is electrically connected to a voltage source (not shown in the figures) via contact pins 21, contact springs 22, and contact slip ring 20. Contact pins 21 and contact springs 22 are arranged on axis 6 of lamp quick-change attachment 5 and are in each case connected to electrical leads 29. Contract slip ring 20 is arranged on axis 6 and is connected to a ground line 30 via contact spring 22($K_3$).

Illuminating beam paths 9 and 10 are similar in construction. Each beam path includes, starting from centrally arranged light source 7, adjustable collector lens system 11, adjustable stop 12, adjustable cold light mirror 13, adjustable illuminating optics 14, filter holder 16 for holding color or gray filters, and adjustable prism 15. Illuminating beam paths 9 and 10 illuminate object 43 via common main objective 4. Each respective illuminating beam path 9, 10 can be individually adjusted at adjustable collector lens system 11, adjustable stop 12, adjustable cold light mirror 13, and adjustable illuminating optics 14. This design is particularly advantageous when the operating microscope 3 is equipped with observation beam paths that can be individually adjusted. Observation beam paths equipped in this manner typically have a freely selectable focal plane in combination with a fixed main objective. Focusable illuminating beam paths are also necessary to realize Köhler illumination.

Figure 3:
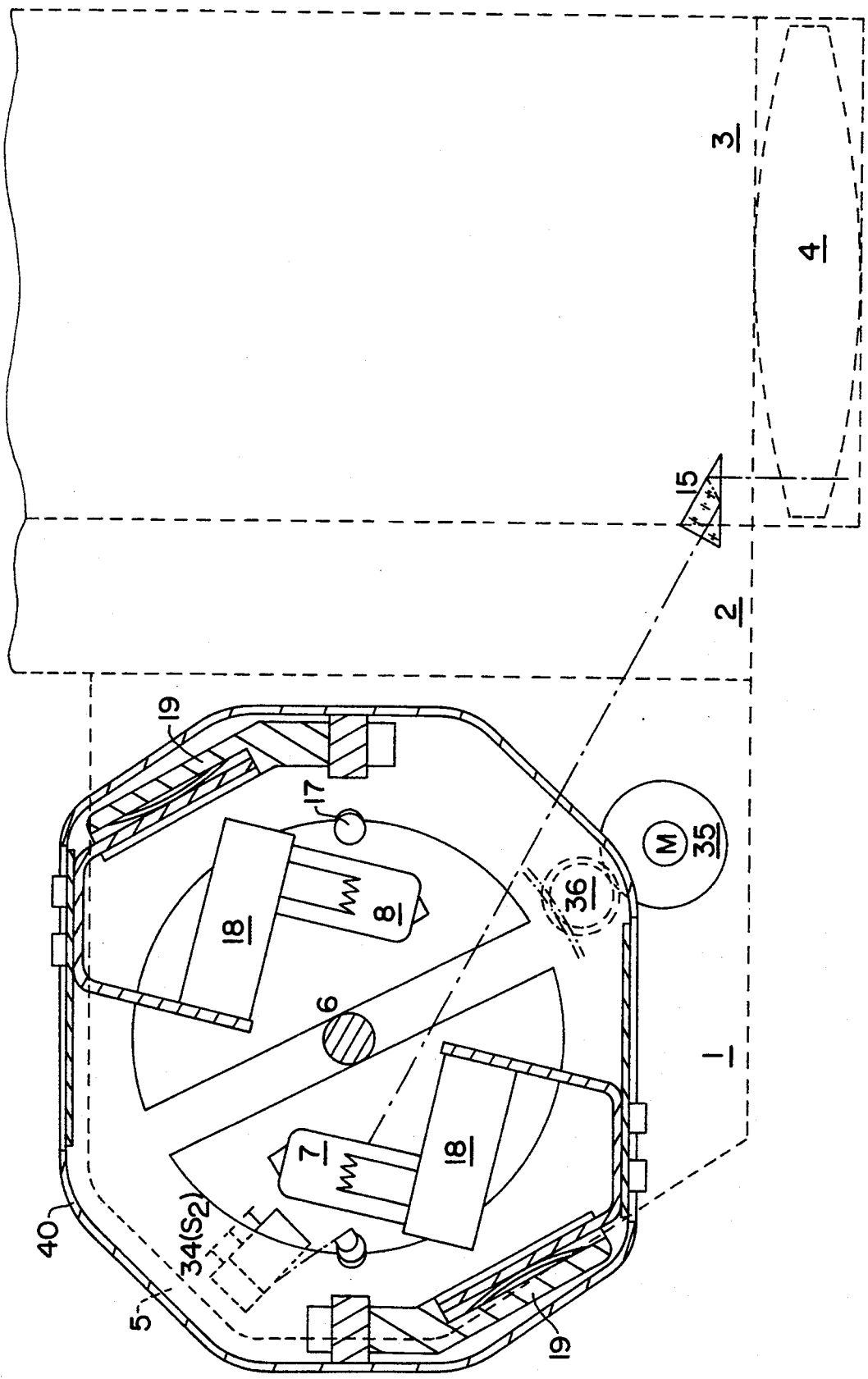
FIG. 3 illustrates a side view of a lamp quick-change attachment in the form of a wheel.

FIG. 3 illustrates a side view of lamp quick-change attachment 5. FIG. 3 illustrates the detailed structure and arrangement of light sources 7 and 8 in quick-change attachment 5. Light sources 7 and 8 are halogen lamps. Light source 7 is firmly connected to a light source holder 18. Holder 18 is connected to an individual dedicated plug-in device 19, which is adjustable. This arrangement ensures that replacement of a defective halogen lamp, together with its holder, can be carried out quickly and precisely. Additional centering and/or adjustment of light sources 7 and 8 is not necessary because the light sources are centered by plug-in device 19 and holder 18.

Figure 5:
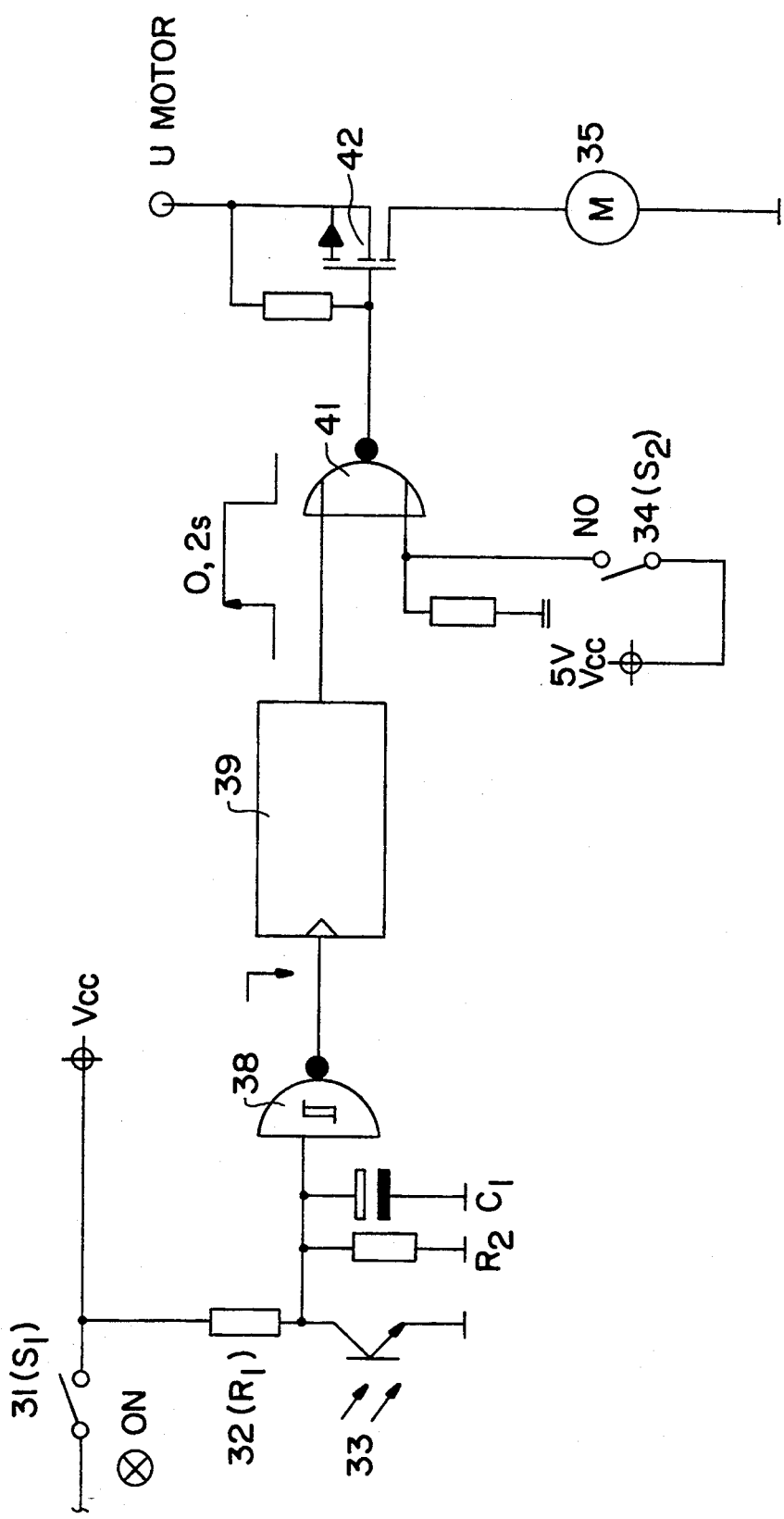
FIG. 5 is a circuit diagram for a motorized drive for the lamp quick-change attachment.

FIG. 3 also illustrates an electric motor 35 with a pinion 36. Pinion 36 is connected to the lamp quick-change attachment 5 and serves as an electromotorized drive connection. The reserve light source 8 is brought into working position by motor 35 using pinion 36 when necessary because, for example, light source 7 has failed. FIG. 5 illustrates an automatic control circuit for motor 35. FIG. 5 will be described in further detail below.

In FIG. 3, optical components in illuminating beam paths 9 and 10 have been deleted for clarity. Only illuminating beam path 9, associated prism 15, and common main objective 4 are illustrated. As indicated in FIG. 3, illuminating beam path 9 apply light only to the edge region of main objective 4.

A click stop 17 is provided on lamp quick-change attachment 5 for the precise positioning of light source 7 and/or reserve light source 8 in the event of a quick lamp change during an operation. Upon failure of light source 7, the electric circuit 311034 illustrated in FIG. 5 activates motor 35, which in turn drives lamp quick-change attachment 5 via pinion 36 until electromechanical switch 34($S_2$) is opened. Opening of electromechanical switch 34($S_2$) turns motor 35 off.

Figure 4:
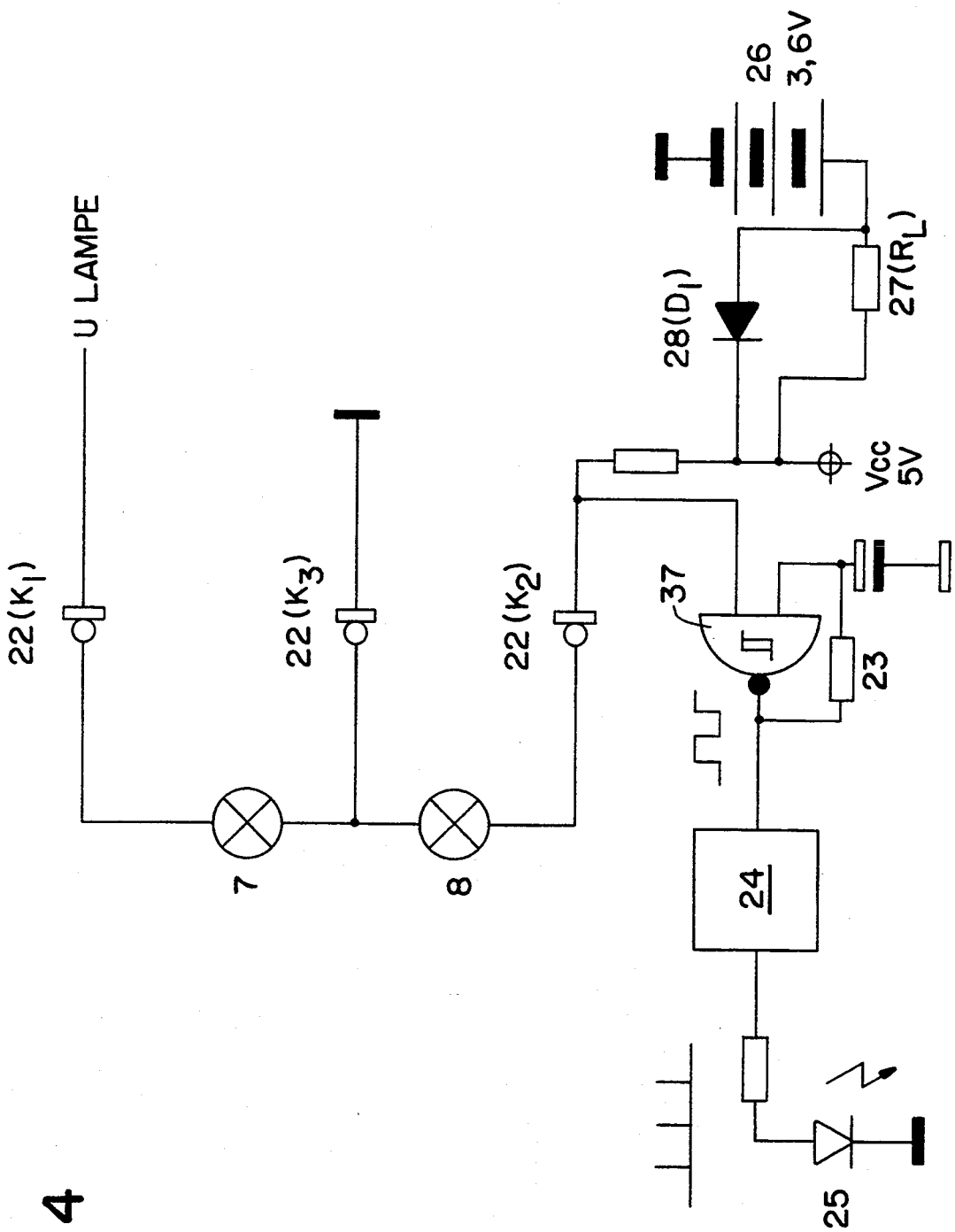
FIG. 4 is a circuit diagram which includes a diode display for indicating a defective light source.

FIG. 4 illustrates a schematic circuit diagram for a light-emitting diode 25 which serves as an annunciator to indicate whether or not light sources 7, 8 have failed. As indicated in FIG. 4, a separate supply voltage Vcc powers an oscillator 23 which is formed from a gate 37, a capacitor $C_o$, and a resistor $R_o$. Oscillator 23 drives light-emitting diode 25 through a pulse shaper 24. When light source 7, 8 has failed or is otherwise defective, oscillator 23 delivers square-shaped pulses to pulse shaper 24 which in turn converts the square-shaped pulses into short individual pulses. As a result, light-emitting diode 25 is supplied with current for a short period of time and thus emits short light pulses.

For this display to function even in the event of an interrupted supply voltage or after the main power supply plug has been disconnected from the main power supply, the circuit of FIG. 4 includes a voltage accumulator 26. Accumulator 26 is recharged during normal operation via a charging resistor 27($R_L$). If the supply voltage is interrupted, light-emitting diode 25 is powered via a diode 28.

FIG. 5 illustrates a schematic diagram of a circuit for controlling motor-driven lamp quick-change attachment 5 using electric motor 35. FIG. 5 will now be described in detail. When a main switch 31($S_1$) is closed, light source 7 is activated. A network 32 composed of resistors $R_1$ and $R_2$, and a capacitor $C_1$ initially suppresses an electrical switching pulse output from a downstream gate 38 until light source 7 reaches its full lighting power. The lighting power of light source 7 is continuously monitored by a light-sensitive sensor 33. When light source 7 fails, sensor 33 generates an output pulse which is fed via gate 38 to a time-switching element 39, which emits pulses having a 0.2 second duration. Motor 35 is then activated by a downstream gate 41 and a MOSFET 42, until switch 34($S_2$) is closed. This places reserve light source 8 into its working position and reactivates sensor 33. When light source 7 fails, light-emitting diode 25 is also activated as described above in conjunction with FIG. 4.

Although the invention has been described above with respect to certain specific embodiments, the scope of the invention is not limited to these specific embodiments. For example, the invention is not limited to illumination systems which have just two separate illuminating beam paths for an operating microscope and is not limited to lamp quick-change attachments with just two light sources for an operating microscope. Rather, the invention can be used in any application where a plurality of illuminating beam paths emerge from a single activated light source. With the invention, identical lighting conditions are created for several outputs (that is, for several observation beam paths). The lamp quick-change attachment can be equipped with more than one reserve light source. The invention is also not limited to one lamp quick-change attachment with one or more reserve light sources, but instead can be provided with additional light sources having different physical and/or optical properties.

Other designs within the spirit and scope of the invention will be apparent to those skilled in the field after receiving the above teachings. The invention, therefore, is defined with reference to the following claims.

What is claimed is:

1. A microscope comprising:
   a lamp housing;
   two separate Köhler illuminating beam paths to illuminate an object via a common main objective, said two Köhler illuminating beam paths originating from mutually opposite sides of a lamp bulb, and said Köhler illuminating beam paths being arranged symmetrically with respect to a plane of a lamp quick-change attachment, wherein each of said Köhler illuminating beam paths comprises a collector lens system, an adjustable stop, a cold light mirror and illuminating optics; and
   said lamp bulb comprises a first light source centrally mounted in said lamp housing to the lamp quick-change attachment, wherein said lamp quick-change attachment is in the form of a wheel and holds at least one additional light source.

2. A microscope as claimed in claim 1, wherein said lamp quick-change attachment is rotatably mounted, and wherein said microscope further comprises a handle to bring a selected additional light source into working position.

3. A microscope as claimed in claim 1, further comprising a motor to position said lamp quick-change attachment.

4. A microscope as claimed in claim 1, wherein said additional light source serves as a reserve light source.

5. A microscope as claimed in claim 4, further comprising:
   a motor coupled to said lamp quick-change attachment; and
   a control circuit to control said motor, said control circuit automatically causing said motor to rotate the lamp quick-change attachment and thereby replacing said first light source with said reserve light source when failure of said first light source occurs.

6. A microscope as claimed in claim 1, further comprising at least one light-emitting diode to indicate a defective additional light source.

7. A microscope as claimed in claim 6, further comprising an accumulator, coupled to said light-emitting diode, to power said light-emitting diode after a main power supply has been switched off.

8. A microscope as claimed in claim 1, further comprising contact springs, contact pins, and a contact slip ring to supply power to said first light source.

9. A microscope as claimed in claim 1, wherein one of said illuminating beam paths further comprises a filter holder.

10. A microscope as claimed in claim 1, wherein at least one of said collector lens system, said adjustable stop, said cold light mirror and said illuminating optics is adjustable.

11. A microscope as claimed in claim 1, wherein an axis of said wheel is arranged perpendicularly to said collector lens system.

12. A microscope comprising:
    a rotatable lamp quick-change attachment;
    a first light source mounted to said lamp quick-change attachment;
    an additional light source mounted to said lamp quick-change attachment;
    an electromechanical assembly associated with a main power supply and said lamp quick-change attachment to automatically replace said first light source with said additional light source whenever a failure in said first light source occurs;
    an annunciator associated with said power supply and at least one of said first and additional light source to indicate that said at least one of said first and additional light source is defective;
    an accumulator, coupled to said annunciator, to power said annunciator after said main power supply has been switched off; and
    two separate Köhler illuminating beam paths originating from one of said first and additional light sources for illuminating an object wherein each of said Köhler illuminating beam paths comprises a collector lens system, a stop, a cold light mirror and illuminating optics.

* * * * *